United States Patent [19]
Kozak et al.

[11] Patent Number: 5,359,172
[45] Date of Patent: Oct. 25, 1994

[54] DIRECT TUBE REPAIR BY LASER WELDING

[75] Inventors: Larry M. Kozak, Greensburg; Richard A. Miller, N. Huntingdon; Wesley G. Pope, Port Vue, all of Pa.

[73] Assignee: Westinghouse Electric Corporation, Pittsburgh, Pa.

[21] Appl. No.: 998,218

[22] Filed: Dec. 30, 1992

[51] Int. Cl.⁵ .............................................. B23K 26/00
[52] U.S. Cl. .......................... 219/121.64; 219/121.66; 376/260
[58] Field of Search ....................... 219/121.63, 121.64, 219/121.65, 121.66; 376/260

[56] References Cited

U.S. PATENT DOCUMENTS

| | | | |
|---|---|---|---|
| 4,177,372 | 12/1979 | Kotera et al. | 219/121.66 |
| 4,414,460 | 11/1983 | Sudo et al. | 219/121.66 |
| 4,500,764 | 2/1985 | Girodi et al. | 219/59.1 |
| 4,577,087 | 3/1986 | Chadwick | 219/121.63 |
| 4,694,136 | 9/1987 | Kasner et al. | 219/121.64 |
| 4,694,137 | 9/1987 | Hawkins et al. | 219/121.63 |
| 4,730,093 | 3/1988 | Mehta et al. | 219/121.63 |
| 4,737,612 | 4/1988 | Bruck et al. | 219/121.64 |
| 4,743,733 | 5/1988 | Mehta et al. | 219/121.66 |
| 4,839,495 | 6/1989 | Kitera et al. | 219/121.63 |
| 4,978,834 | 12/1990 | Griffaton | 219/121.63 |
| 5,006,268 | 4/1991 | Griffaton | 219/121.63 |

FOREIGN PATENT DOCUMENTS

| | | | |
|---|---|---|---|
| 9114799 | 10/1991 | European Pat. Off. | 219/121.66 |
| 115486 | 1/1989 | Japan . | |
| 0062290 | 3/1989 | Japan | 219/121.65 |

Primary Examiner—C. L. Albritton

[57] ABSTRACT

The wall of a pressure vessel tube having stress-corrosion cracks or the like is repaired by localized melting using laser welding, for fusing over defects by melting and re-solidifying the metal. A high powered laser beam is focused at a limited area or spot on the internal wall of the tube. The welding head is operated at sufficient power and is relatively moved in the tube at a sufficient rate to melt the spot while advancing along a line on the internal surface of the wall. The wall is melted to a depth of part or all of the thickness of the wall. Points at which the tube has been melted by the focused beam cool following passage of the welding head. The welding head is also advanced laterally of the line, either continuously or stepwise. Localized melting and cooling of the tube material continues progressively, line by overlapping and/or adjacent line, to melt and reform the degraded area. By successively melting, and optionally alloying linear sections of the wall using an alloying material, stress-corrosion cracks and similar defects are fused over, repairing the degraded area. The localization of the melting is such that the metal does not substantially flow and the metal cools quickly following passage of the weld head, to below a temperature of sensitization.

29 Claims, 4 Drawing Sheets

DIRECT TUBE REPAIR BY LASER WELDING

BACKGROUND OF THE INVENTION

1. Field of the Invention

The invention relates to reforming degraded areas in ductile materials, in particular by melting a localized area to a predetermined depth, re-forming the localized area by cooling it, and advancing the localized melting and cooling through the degraded area to restore it to an integrally continuous form. The melting preferably involves scanning over a surface along successive adjacent lines on the inside surface of a tube, to progressively melt and fuse over defects at least to a depth sufficient to restore the tube to a serviceable condition for effecting heat exchange, pressure confinement or the like. The invention is particularly applicable to fusing service-induced stress and corrosion defects in coolant circuit tubes of pressurized water nuclear reactors. Localized melting is preferably accomplished by welding, especially with a laser weld head. An alloying material can be included during welding, the alloying material being supplied as a powder, gas or self-supporting tube and consumed in the process.

2. Prior Art

Heat transfer tubes in the steam generator systems of nuclear power plants are subject to degradation over time of the primary pressure barrier in zones of high mechanical stress. The pressure and temperature of coolant in the coolant circuit can be substantial. Static pressure due to the coolant may be on the order of 100 bar (2,200 psi) in the coolant circuit and the coolant temperature can be 600° F. when the plant is operational. The thermal and mechanical stresses applied to the tubes tend to degrade the tubes in the regions of highest stress.

One area of concern is the tubing in heat transfer devices. In a reactor system, heated water from a primary coolant circuit is passed through heat exchanger tubes having a second flow of water passing outside the tubes. Should the barrier defined by a tube deteriorate, the secondary coolant may become contaminated with radiation from the primary coolant. It is expensive to replace the heat exchangers, and methods have evolved for repairing degraded steam generator heat exchanger tubes in various situations. However, the inaccessibility of the heat exchanger tubes as well as the radioactive environment surrounding the heat exchanger tubes present difficult problems.

A steam generator heat exchanger generally has a number of substantially parallel-flow tubes coupled between inlet and outlet manifolds. Whereas there are parallel alternative flow paths, one method of dealing with a deteriorated steam generator tube is to simply plug lit to prevent leakage. Plugs are inserted upstream and downstream of the plugged zone, isolating the zone of deterioration from the primary side coolant, and thus preventing leakage.

Plugging an affected tube reduces the active heat exchange surface area and results in a reduction in steam generator performance. Designers build an extra margin into the design of heat exchangers of this type, in recognition that it may become necessary in the future to plug some of the heat exchanger tubes without replacing the entire unit. If carried to an extreme in which the number of plugs installed exceeds the plugging margin provided according to the steam generator design, the steam generator must be de-rated because the rated heat generation capacity exceeds the available heat transfer capacity of the heat exchanger.

An alternative repair known as sleeving involves isolating only the surface of the tube in the area of deterioration while allowing primary coolant to flow in the tube, i.e., without removing the entire tube from service. Sleeving involves fitting an undersized length of tubing (the sleeve) into the affected tube, and attaching the sleeve upstream and downstream of the degraded zone to the inner walls of the tube, preferably sealing the sleeve to the tube to prevent leakage between them. The sleeve forms a seal and restores the integrity of the pressure boundary. The sleeve may be attached to the walls of the tube by mechanical means, such as by forming complementary bulges in the sleeve and the tube after positioning the sleeve to lap the area to be repaired. For a hermetic leak-tight seal the sleeve can be welded to the tubing, for example using gas tungsten arc or laser welding. Alternatively, the sleeve and tube can be attached by brazing. In either case, the sleeve is joined to the tube along the ends of the sleeve, typically along a circular line at each end of the sleeve.

The sleeve does not completely occlude the tube like a plug, but there are penalties. Thermal transfer declines due to flow reduction resulting from the reduced internal diameter of the tube and the discontinuity defined by the sleeve. In an extensive sleeving program, or in a generator that already has a large number of plucks, sleeving may not be practical. The thermal transfer characteristics of the heat exchanger tube are adversely affected by a sleeve. The sleeve thickens the overall tube wail. Any area of relatively lower thermally conductive contact between the sleeve and the original tube, such as a gap or corroded zone, forms an insulating zone, reducing the heat transfer efficiency of the system. The effect of a single sleeve may not be large, but large scale sleeving, especially in the support plate regions, can significantly reduce the efficiency of the steam generator.

The attachment zone of the sleeve, depending on the specific method of attachment to the tube, produces a local stress concentration in the original parent tube. The zones of attachment are at increased risk of further primary water attack with continued operation of the generator, requiring additional treatments or operations to reduce susceptibility to degradation at the attachment zones. Sleeves thus introduce additional process steps, down-time, and costs for materials and equipment.

Sleeving for a steam generator plant of this type must be made to specific requirements of the ASME Code. Because applications vary, the length and configuration of the sleeves needed varies as well, making it necessary to stock a large variety of sleeves to enable repairs at different areas.

Laser welding is one means to attach a supplemental sleeve inside a tube. U.S. Pat. No. 4,694,136—Kasner et al discloses welding the ends of a sleeve to the inner walls of a heat exchanger tube in this manner. After placing the sleeve inside the tube and mechanically forming complementary annular bulges in the sleeve and the tube to fix them against displacement, a 500 to 700 watt laser beam is applied to the inner surface of the sleeve, either in successive closely spaced lines or in a helical continuous line. The area melted by the laser is about 0.24 inches in width (0.61 cm) and extends completely through the material of the sleeve, and about 0.025 inches (0.064 cm) deep into the tube, or about halfway through the tube wall. The melted material of the sleeve and tube are mingled and fused around the circumference at the point of attachment, forming a hermetic connection of the sleeve and the tube.

According to Japanese Patent Publication 2-199,397, dated Aug. 7, 1990, it is known to heat-treat degraded areas of a tube along the inner surface as a means to reduce the later occurrence of cracking caused by tensile stress and corrosion. The incidence of stress-corrosion cracking in austenitic stainless steel is particularly increased if the steel has been heated to a temperature between 550° and 800° C. (about 1,000° to 1,500° F.). The phenomenon of increased cracking within this temperature range, known as sensitization, occurs due to precipitation of carbides from solution with the iron, especially along interstices between fine granular bodies. Typically, in the production of steel, care is taken to cool the steel quickly through the sensitization temperature range, to minimize the degradation of structural integrity caused by sensitization. According to said Japanese Patent Publication 2-199,397, heat treating is accomplished using a YAG laser beam to produce a temperature rise on the inner surface that is limited to below the temperature of sensitization. The laser beam is focused at a localized internal surface of the pipe and moved over a predetermined axial length at a sufficient rate to limit the temperature rise. A chromium or titanium powder can be applied to the internal surface prior to heat treating, for improving the stress-corrosion characteristics of the tube as a part of the heat treating process. The heat treatment is described as thereby assisting in either preventing stress-corrosion cracks or repairing stress-corrosion cracks after they have occurred.

Plugging and sleeving deal with problems in the structure of a tube by isolating the degraded portion of the tube from the primary coolant. Heat treating prior to the occurrence of cracks may be helpful, but heat treating after cracks have occurred requires the application of additional material, and therefore resembles sleeving. It would be desirable to reconstitute the tube rather than to patch over or isolate it to deal with a deteriorated zone. Reconstituting the tube in situ by actually melting and then solidifying the tube material would preclude the need for add-on structures adversely affecting the flow characteristics of the tube or the plant. An additional material can be employed for alloying with the material of the original tube, or the tube can simply be reformed from its original metal.

Whereas melting a metal allows the metal to flow, it would appear to be impossible to reform a tube in this manner without providing some form of mold for support. However, by melting only a small localized area at any one time, e.g., by laser welding, proceeding along the length of the tube to be repaired in a generally helical or axial scanning pattern, and/or along parallel lines or the like, it is possible according to the invention to reform the tube incrementally and to fuse over stress-corrosion cracks. Moreover, by melting a small area at a time using a focused laser, the melted metal is retained in place by the surrounding solid metal. As the point of welding passes, the thermal sink provided by the surrounding metal quickly cools the solidified metal through the sensitization range.

It is an object of the invention to repair a tube having a deteriorated area, especially a heat exchanger tube in the heat exchanger of a nuclear steam generator plant, by melting a depth of the inner surface of the tube using welding technology, thereby fusing over cracks and rendering the tube material once again continuous over the zone of deterioration, and to a sufficient depth to return the tube to serviceable condition.

It is a further object of the invention to repair a pressure vessel tube without substantially decreasing the internal diameter of the tube or increasing the external diameter, by melting and reforming the tube material at a localized small area, and scanning the area of localized melting to proceed over the tube surface in adjacent or overlapping lines.

It is another object of the invention to provide a means to repair a tube conveniently, which improves over results obtainable either by plugging the tube, by adding a supplementary support/sealing sleeve, or by heat treating the tube in the presence of a supplemental material. In particular it is an object to melt and reform the tube in incremental lines so that cracks are fused over and the heat exchange capacity of the repaired tube is at least as good as that of the original tube.

It is also an object of the invention to employ a tracking optical welding technique using a high powered laser, for surface welding at least a depth at the inside of a tube along a progressive overlapping spiral path, at a sufficiently slow rate of advance and a sufficiently high power level, to melt the tube at an isolated area that quickly cools after the welding point passes.

It is another object of the invention to improve the surface of a pressure vessel tube by surface welding, optionally in the presence of an alloying material which modifies the characteristics of the original tube in the area of the repair. The alloying material can be a welding powder, gas or consumable sleeve disposed in the degraded area prior to or concurrently with welding.

These and other aspects of the invention are met in a method for repairing a wall of a pressure vessel tube having a degraded area by melting a localized area to a predetermined depth, re-forming the localized area by cooling it, and advancing the localized melting and cooling through the degraded area to restore it to an integrally continuous form. The repair is effected by positioning in the tube a high powered laser welding head with the beam energy focused at a limited area or spot on the internal wall of the tube. The welding head is relatively moved in the tube at a sufficient rate to weld along a line on the internal wall for melting the tube in the degraded area at least to a depth equal to a part of the thickness of the tube wall. The depth of melting is sufficient to restore the tube to serviceable condition by reforming a functionally sufficient thickness of tube, with regard to the particular purpose of the tube. The point at which the tube has been melted by the focused energy cools following passage of the welding head. As the point of application of the welding head advances along a line, the line is likewise advanced laterally. Localized melting and cooling of the tube material continues, line by adjacent or overlapping line, to encompass the degraded area. By successively melting, and optionally applying one or more alloying materials such as a powder, aerosol or insert, using materials known in the art, linear sections of the wall, stress-corrosion cracks and similar defects are fused over, repairing the degraded area. The optional additional welding material can be employed for improving the characteristics of the tube as compared to the original tube. Preferably, the lateral advance is less than the width of localized melting, causing the lines to overlap and continuously re-form the degraded surface. Although the entire surface of the tube can be melted and reformed in this manner, the localization of the melting at any one time is such that the metal does not substantially flow and the metal cools quickly following passage of the weld head, to below the temperature of sensitization. The advance of the welding line and the lateral displacement can be stepwise or continuous, and can be oriented axially or radially.

The realization of these objects will be appreciated from the following discussion of particular exemplary embodiments of the invention. However it should also be appreciated that the invention is capable of variation from the examples, in accordance with the scope of the invention as claimed.

DETAILED DESCRIPTION OF THE PREFERRED EMBODIMENTS

Figure 1:
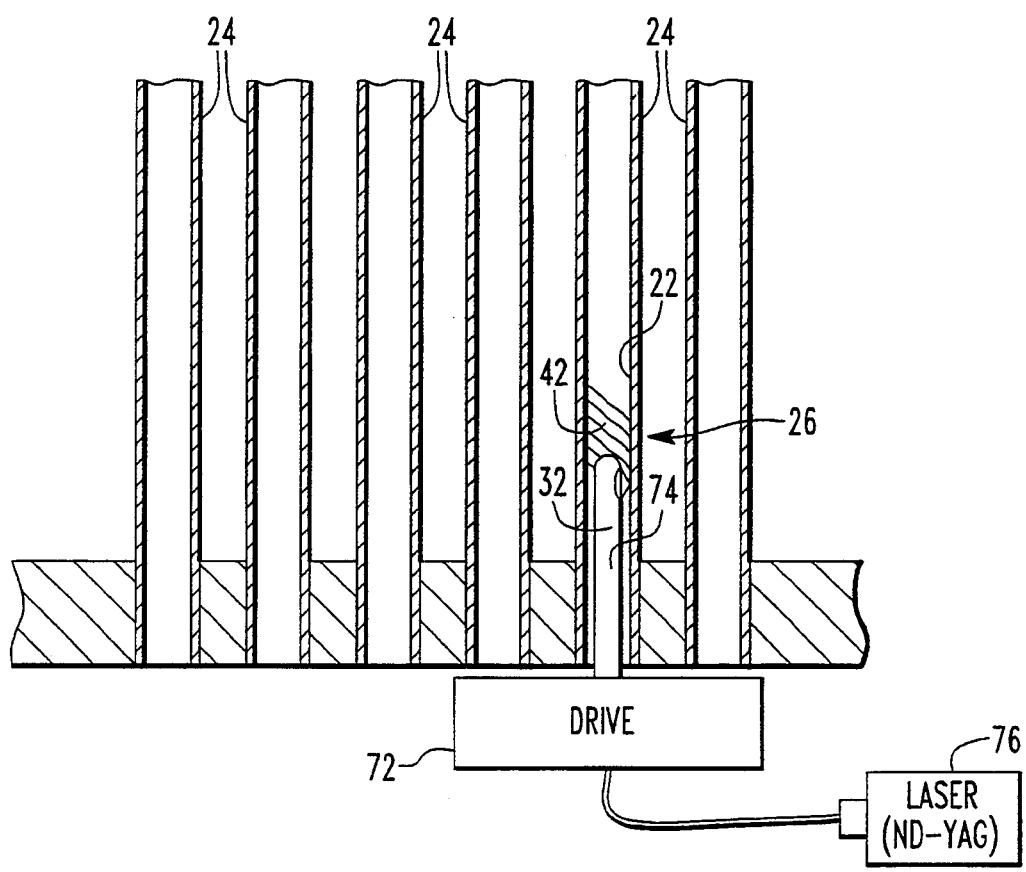
FIG. 1 is a partial section view showing application of the invention to the repair of heat exchanger tubes in a nuclear steam generator plant.

Referring to FIG. 1, for repairing a wall 22 of a pressure vessel tube 24 having a deteriorated zone, a welding head 32 is placed into the tube 24 at the deteriorated zone. The welding head is activated and moved progressively relative to the tube so as to melt a localized area at a point along a line 42 on a surface of the wall. As the welding head is advanced, a welding line is formed, with the tube material behind the point of application of the weld head cooling and solidifying. The welding process melts and fuses the degraded area over a welding line having a width equal to the localized point of melting, and to a depth in the wall 22 defined by the dimensions over which the welding head applies energy, the amplitude of the energy applied and the time the energy is applied to a given location. The welding head is operated at a sufficient power level and is advanced at a sufficiently slow speed that the localized point is melted to a depth such that after solidifying the tube is restored to serviceable condition for its intended use. Solid material surrounds the localized area that is melted at any one time, and supports the melted material. After passage of the welding head, the surrounding solid material cools the material quickly by carrying away the thermal energy applied by the welding head.

Any defects which were present in the degraded zone of the tube become fused due to the melting of the tube material. The weld melts the material of the tube at least to a depth equal to a part of a thickness of the wall. It is possible to melt entirely through the depth of the tube wall, because the melted volume is conical or cup-shaped in cross section, with the width of the melted portion being greatest at the radial inside of the tube, and less proceeding away from the weld head. The melted material cools upon passage of the weld head, whereupon a repair has been effected without the necessity of adding to the wall thickness, plugging the tube or otherwise adversely affecting the flow and thermal characteristics of the tube.

Continuously during melting along a first line, or stepwise after the weld line has passed over a predetermined length, the welding head 32 is displaced laterally of the first line. Localized melting is continued along a line which is adjacent or overlapping the first line to melt and cool, thus to reconstitute the degraded area over a further width adjacent the first weld line. The weld head is advance linearly and laterally in this manner, successively melting linear sections of the wall and fusing the wall over the entire degraded area in a raster-like series of passes. The weld line is preferably advanced laterally by an amount less than the width of the weld line 42, such that the first weld line and the further weld line partly overlap, and a part of the first weld line is remelted in the process of forming the next.

The lateral advance can be stepwise or continuous and can involve any pattern of adjacent, preferably-overlapping passes which encompass the whole area of the repair. One alternative is to rotate the welding head relative to the axis of the tube to form the welding line and axially to advance the welding head relative to the tube to form the further width. When advancing the line of welding continuously, this motion produces a helical pattern of weld lines as shown in FIGS. 1 and 2.

Figure 3:
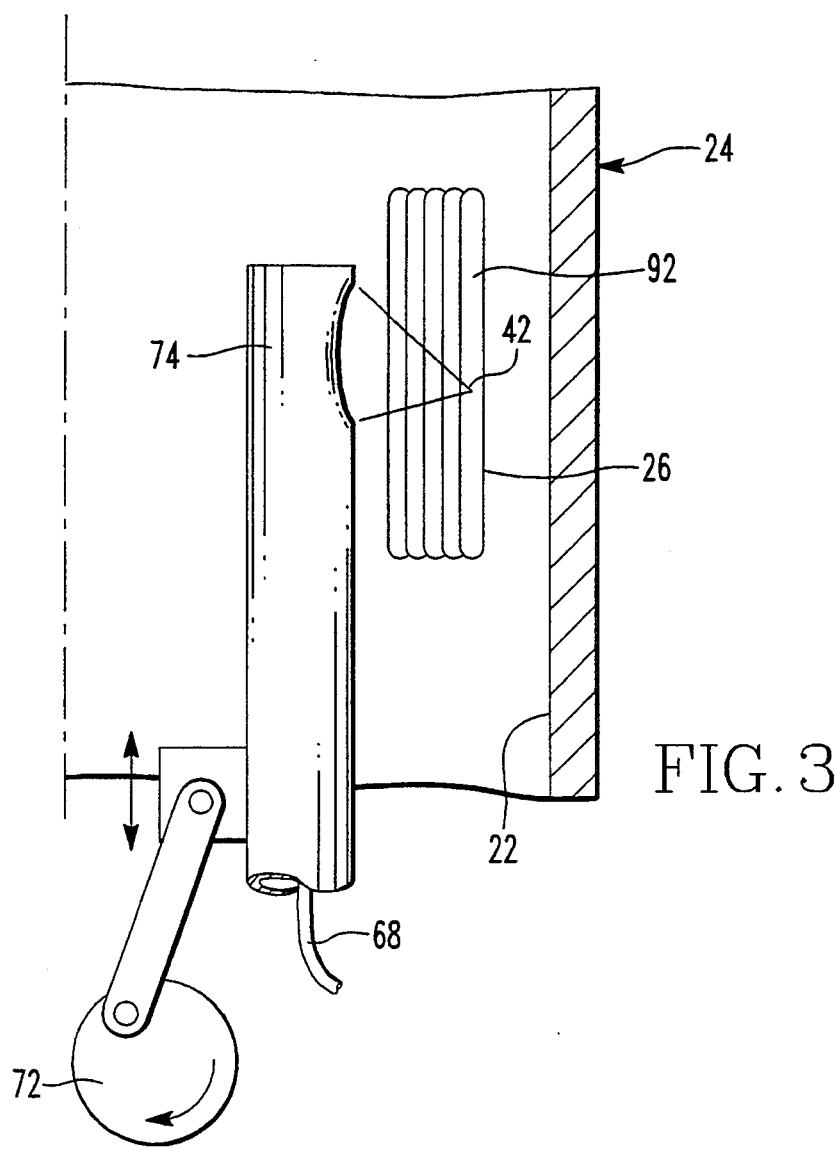
FIG. 3 is a schematic illustration of a method for relative displacement of the tube and welding means.

Another alternative is to relatively displace the point of application of energy via the welding head and the tube axially in an oscillating motion to form the welding line. The welding head is also relatively rotated with respect to the tube to form the further width. The pattern produced by this motion is represented by FIG. 3. The rotation can be stepwise, continuous or oscillating.

Preferably, the welding process uses laser welding, although other means for isolated local melting of a point on the tube are also possible. For laser welding the welding head comprises an optical system 62, directing laser emissions onto the degraded area 26. Mirrors 64, lenses 66 and fiber optic light conduits 68 can be employed. An example of an appropriate laser welding device for use according to the invention is disclosed in U.S. Pat. No. 4,694,136—Kasner et al, which is hereby fully incorporated here in.

Figure 2:
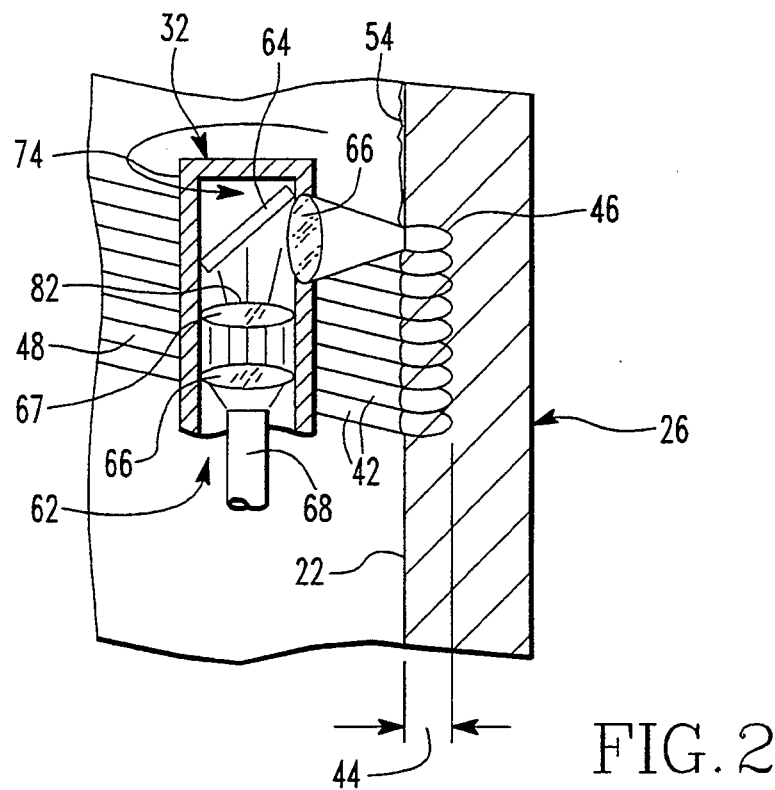
FIG. 2 is a schematic illustration of a welding means for directing laser emissions against the inner walls of a tube to be repainted by localized melting of the tube along a scanned progressive pattern.

Referring to FIGS. 1 and 2, a drive means 72 is operable to rotate and axially translate a stem 74 comprising the welding head 32. The fiber optic cable 68 couples the welding head to a high powered laser 76, for example a ND:YAG laser. The distal end 82 of the fiber optic cable is spaced from mirror 64. A first lens 66 collimates the light diverging from the end of the fiber optic cable and a second lens 67 focuses the light at the point of application to the tube wall. Lens 67 has a focal length substantially equal to the sum of the distances between lens 67 and the center of mirror 64, and between mirror and the point of welding. The light emitted from the fiber optic cable is thereby focused at a spot on the area 26 of tube 24 that is being repaired. The drive means 72 can rotate the stem relative to the fiber optic cable. Whereas the light is collimated between lenses 66 and 67, the axial position between end 82 and lens 66 is held constant, i.e., at the focal distance of the lens. The distance between lenses 66 and 67 can be varied, e.g., with axial displacement due to operation of the drive means 72. However, it is preferred in connection with axial displacement to move the welding head or stem axially as a unit to effect axial displacement.

FIGS. 1 and 2 illustrate an embodiment arranged to produce a helical pattern 48 of weld lines. In FIG. 3 an axial pattern is produced, using an axially oscillating drive means that moves the weld head up and down in the tube. A motor 96 can be provided for this purpose as shown. As in the previous embodiment, lenses focus the light emitted at the end 82 of the fiber optic cable 68.

The welding head 32 is advanced axially and rotationally to cover the entire deteriorated area 26, in a series of passes. Parallel axial weld lines as shown in FIG. 3 can be made by rotationally indexing the weld head. Slanting or helical lines can be made by rotating the weld head continuously during scanning of the laser beam.

In order to guide each weld line so as to evenly overlap the previous weld line, it is possible to vary the rate of advance (and perhaps focusing) of the laser beam on the workpiece. Preferably, each weld line is tracked relative to the position of a previous weld line. This can be accomplished by providing a guide on the welding head, operable to rest against a ridge or other dimensional variation at the edge of the last weld line.

Figure 4:
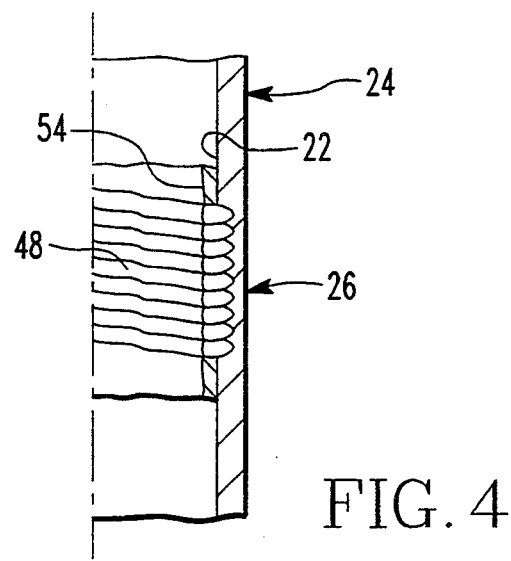
FIG. 4 is an elevation view partly in section showing application of an alloying agent in connection with the welding.

FIG. 4 shows the surface appearance of the inside wall of a tube following a direct surface repair according to the invention. Each weld line in this case is placed adjacent the previous line, with a slight overlap, e.g., 50 to 80% of the width of the weld line. The specific power level of the laser can be varied as needed to accommodate a desired area over which the laser is to be focused, and a desired rate of advance. An average power of at least 200 watts can be used for welding, and an average power of 200-800 watts can be used advantageously.

The depth of the weld can be varied as a function of power level, focusing and rate of advance, in order to melt the tube material to the required depth. The temperature of melting of course varies with the material of the tube. For Inconel 600 stainless steel (ASME Alloy 600), as advantageously employed for steam generator heat exchanger tubes, the melting temperature is about 1,350° to 1,410° C. (or 2,470° to 2,575° F.). The typical thickness of the tube wall of a nuclear steam generator is about 0.050 to 0,055 inches (1.3 to 1.4 mm). Preferably the weld depth extends through 80 to 100% of the wall thickness. Of course it is possible to apply the invention to thicker or thinner tubes or to materials other than stainless steel, by correspondingly changing the power level, the rate of advance of the beam, etc. The dimensions, power levels and the like are exemplary only.

Figure 5:
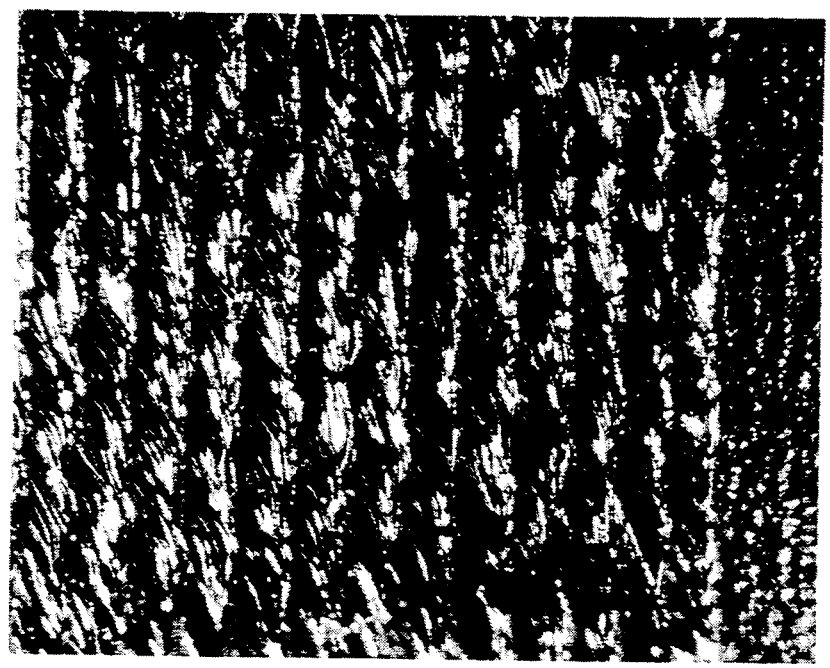
FIG. 5 is plan view of a tube inside surface following a direct tube repair as described.
Figure 6:
FIG. 6 is a longitudinal section view through a weld line according to FIG. 1; and, FIG. 7 is a lateral cross section through an alternative form of repair using a consumable insert alloying material.
Figure 7:
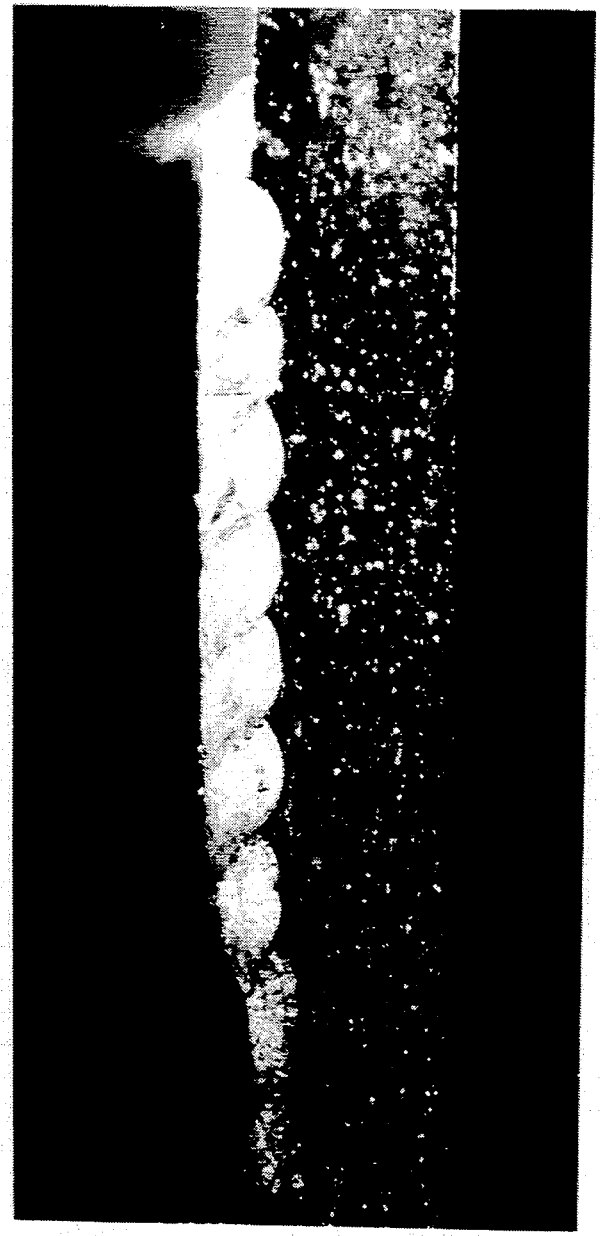

FIG. 5 shows an elevation view of an actual tube weld, including the partly overlapping weld lines. The surface of the inner surface of the tube is rendered somewhat less smooth due to the welds, however the inside diameter of the tube is only minimally reduced. As shown in FIG. 6 via a longitudinal cross section through a line of welding, a shallow penetration surface repair by welding melts the tube through about 40% of its thickness. With the use of a narrow bead, the weld can extend through 100% of the tube thickness. This is possible because the bead tends to taper in cross section, having a typically conical shape as shown in FIG. 7. Although the melted material extends through the wall, the lateral dimensions of the bead at the outer wall surface are relatively small. Accordingly, the unmelted portion of the tube mechanically supports the melted bead. The area which is melted at any one time is relatively small and does not tend to flow, making it possible using this technique to weld quite deeply into the tube. Additionally, the heat energy applied at the welding point is quickly carried away and the melted portion cools promptly after the welding head passes.

An alloying material 54 (shown in FIGS. 2 and 4) can be diffused into the material of the tube during the welding process, and consumed. The alloying material can be applied as a powder that is sprayed or painted onto the tube surface, either before or during welding, for example together with application of a welding cover gas. The alloying material may also be applied as a sleeve shaped insert that is consumed in the process and fused with the melted and reformed material of the tube. The results of welding over an alloying material 54 are shown in a lateral cross section through a series of weld lines in FIG. 6.

The invention is particularly applicable to correcting degradation of the heat transfer tubes of a nuclear steam generator plant. Typically, a plurality of individual tubes 24 are arranged parallel to one another and extending between inlet and outlet manifolds, one wall 25 of a manifold being shown in FIG. 1. Access to the tubes can be obtained from inside the manifolds, for example controlling the weld head by remote control and thus avoiding human exposure to the environment of the reactor systems.

The invention having been disclosed, a number of variations and alternatives will now be apparent to persons skilled in the art. The invention is not limited to the examples disclosed above and includes a reasonable extent of variation in accordance with the appended claims, to which reference should be made in assessing the scope of the invention in which exclusive rights are claimed.

We claim:

1. A method for repairing a wall of a tube having a degraded area, comprising the steps of:
   placing a welding head into the tube at the degraded area;
   activating and moving the welding head relative to the tube so as to melt a localized area that is advanced along a line of welding on a surface of the wall, thereby melting the degraded area over a first welding width along the line of welding, and at least to a depth of 80% of the thickness of the wall, allowing the localized area to cool following passage of said welding head; and,
   laterally advancing the line of welding and continuing said welding to melt the degraded area over a further width adjacent the first welding width, thereby successively melting and fusing the wall along linear sections.

2. The method according to claim 1, comprising advancing the line of welding laterally by an amount less than said first welding width, whereby the first welding width and the further width partly overlap.

3. The method according to claim 2, comprising advancing the line of welding continuously while melting.

4. The method according to claim 2, comprising rotating the welding head relative to the tube to form said welding line and relatively displacing the welding head axially of the tube to form said further width.

5. The method according to claim 4, comprising advancing the line of welding substantilly continuously, thereby providing a helical pattern of weld lines.

6. The method according to claim 2, comprising relatively displacing the welding head and the tube axially to form said welding line and relatively rotating the tube and the welding head to form said further width.

7. The method according to claim 1, further comprising employing an additional alloying material during said melting, the alloying material comprising at least one of a powder coating, an insert and an aerosol entrained in a welding cover gas.

8. The method according to claim 1, wherein the welding head comprises an optical system, and wherein said welding step includes directing laser emissions onto the degraded area via the optical system.

9. The method according to claim 8, wherein the laser emissions are directed via at least one of a mirror, lens and fiber optic light conduit.

10. The method according to claim 1, further comprising tracking relative motion of the tube and the welding head as a function of a position of a previous weld line.

11. The method according to claim 8, wherein the laser emissions are applied at an average power of at least 200 watts.

12. The method according to claim 1, wherein the tube is a heat exchanger tube of a steam generator.

13. A method for repairing a wall of a heat exchanger tube of a nuclear steam generator, the wall having a degraded area, comprising the steps of:
  placing a welding head into the tube at the degraded area;
  activating and moving the welding head relative to the tube, said activating being at a sufficient power level and said moving being at a sufficiently low speed so as to melt a localized area that is advanced along a line of welding on a surface of the wall, the degraded area being thereby melted over a first welding width along the line of welding, at least to a depth of 80% of the thickness of the wall, and solidified with cooling following passage of said welding head; and,
  laterally advancing the line of welding and continuing said welding to melt the degraded area over a further width adjacent the first welding width, thereby successively melting and fusing the wall along linear sections.

14. The method according to claim 13, comprising advancing the line of welding laterally by an amount less than said first welding width, whereby the first welding width and the further width partly overlap.

15. The method according to claim 13, further comprising employing an additional alloying material during said melting, the alloying material comprising at least one of a powder coating, an insert and an aerosol entrained in a welding cover gas.

16. The method according to claim 13, wherein the welding head comprises an optical system, and wherein said welding step includes directing laser emissions onto the degraded area via the optical system.

17. The method according to claim 16, wherein the laser emissions are directed via at least one of a mirror, lens and fiber optic light conduit.

18. The method according to claim 13, further comprising tracking relative motion of the tube and the welding head as a function of a position of a previous weld line.

19. A method for restoring a heat exchanger tube with a wall having a thickness, the wall being characterized by a degraded area extending into the thickness, the method comprising the steps of:
  melting a localized area of the wall to a depth of at least 80% of said thickness in the degraded area;
  allowing the localized area to cool and solidify, thereby reforming the localized area to said depth; and,
  proceeding to melt a further localized area of the wall in the degraded area and allowing the further localized area to cool, continuing to melt and cool successive localized areas to substantially encompass the degraded area of the wall.

20. The method according to claim 19, wherein said melting, allowing to cool and proceeding steps are accomplished by heating at a point while advancing the point along a line, points passed along the line being allowed to cool and solidify.

21. The method according to claim 20, comprising advancing the point along the line to pass adjacent a previous part of the line which has cooled and solidified.

22. The method according to claim 21, comprising advancing the point along the line such that the localized area melted overlaps an area that was melted, cooled and solidified at the previous part of the line.

23. The method according to claim 21, wherein the heating is accomplished using a welding head disposed inside the heat exchanger tube.

24. The method according to claim 23, wherein the heating is accomplished by moving a laser welding head along a scanning pattern inside the heat exchange tube.

25. A method for restoring a steam generator tube with a wall having a thickness, the wall having a degraded area extending into the thickness, the method comprising the steps of:
  melting a localized area of the wall to a depth of at least 80% of said thickness in the degraded area; and
  allowing the localized area to cool and solidify, thereby reforming the localized area to said depth.

26. The method according to claim 1, wherein the tube has an outer surface and the degraded area is melted to a depth which is within 10 mils of the outer surface.

27. The method according to claim 13, wherein the tube has an outer surface and the degraded area is melted to a depth which is within 10 mils of the outer surface.

28. The method according to claim 19, wherein the localized area is melted to depth of about 100% of the thickness of the wall.

29. The method according to claim 25, wherein the localized area is melted to a depth of about 100% of the thickness of the wall.

* * * * *